United States Patent [19]

Haage et al.

[11] Patent Number: 5,655,864
[45] Date of Patent: Aug. 12, 1997

[54] EXPANSIBLE FIXING PLUG

[76] Inventors: Manfred Haage, Im Rank 16, D-72280 Dornstetten; Günter Seibold, Beethovenstrasse 11, D-72285 Pfalzgrafenweiler; Bernd Plocher, Im Wiesengrund 24, D-72108 Rottenburg; Bernd Hein, Marktplatz 2, D-72250 Freudenstadt; Wilfried Weber, Am Stücklesberg 10, D-72296 Schopfloch, all of Germany

[21] Appl. No.: 507,221

[22] Filed: Aug. 10, 1995

[30] Foreign Application Priority Data

Feb. 8, 1994 [DE] Germany ............... 44 03 894.1

[51] Int. Cl.⁶ ........................................ F16B 13/06
[52] U.S. Cl. ........................ 411/45; 411/15; 411/57; 411/44; 403/206; 403/208; 403/215
[58] Field of Search ................. 411/16, 17, 44–46, 411/48, 57, 59, 60; 403/206, 208, 215, 225, 297

[56] References Cited

U.S. PATENT DOCUMENTS

| 4,135,432 | 1/1979 | Schalge et al. | 411/57 |
| 4,142,440 | 3/1979 | Schefer | 411/57 |
| 4,518,291 | 5/1985 | Lang et al. | 411/60 |
| 4,564,324 | 1/1986 | Leibhard | 411/3 |
| 4,710,223 | 12/1987 | Matejczyk | 75/248 |
| 5,186,590 | 2/1993 | Oldendorf | 411/45 |
| 5,246,323 | 9/1993 | Vernet et al. | 411/59 |

FOREIGN PATENT DOCUMENTS

| 401159 | 12/1990 | European Pat. Off. | 411/59 |
| 2028950 | 3/1980 | United Kingdom | 411/59 |

Primary Examiner—Steven N. Meyers
Assistant Examiner—Tuyet-Phuong Pham
Attorney, Agent, or Firm—Michael J. Striker

[57] ABSTRACT

In an expansible fixing plug having an internal bore passing right through the plug body into which an expansion bolt in the form of a nail or screw is to be driven, the internal bore is arranged helically wound around the center line and at least for a part of its length has a diameter that is the same as or slightly smaller than the outer diameter of the expansion bolt.

14 Claims, 3 Drawing Sheets

EXPANSIBLE FIXING PLUG

BACKGROUND OF THE INVENTION

The invention relates to an expansible fixing plug having an internal bore passing right through the plug body into which an expansion bolt in the form of a nail or screw is to be driven, and to a method for the manufacture thereof from metal.

Expansible fixing plugs of that kind made of plastics material are already sufficiently well known. The internal bore of these expansible fixing plugs generally runs axially parallel and tapers towards the leading end of the plug. In the region of the tapering internal bore, these expansible fixing plugs have longitudinal slits to allow expansion as the expansion bolt is driven in. In order to achieve a satisfactory expansion, in particular also in soft building materials, the tapering internal bore terminates in a cleft, the internal width of which corresponds to the slit width. This very sudden taper of the internal bore requires a high insertion resistance which, when using the known fixing plugs in hard building materials, may in some circumstances prevent the expansion bolt from being driven fully home. Moreover, because the expansion is effective only for a part of the length of the expansible fixing plug, a holding force commensurate with the high insertion resistance is not achieved. Such an expansion principle is therefore also little suited to cavity bricks, since stress peaks are able to occur in individual webs of the cavity bricks as a result of the uneven distribution of the expansion force, and these stress peaks lead to destruction of the brick. Moreover, in the known expansible fixing plugs the central and axially parallel arrangement of the internal bore and longitudinal slits produces a preferred expansion direction for the entire length of the fixing plug, which firstly produces a cleaving effect and secondly, despite high insertion resistances, does not allow stress to be distributed uniformly in the drilled hole, which would give rise to high holding forces.

SUMMARY OF THE INVENTION

It is therefore an object of the present invention to provide an expansible fixing plug which avoids the disadvantages of the prior art.

In keeping with these objects and with others which will become apparent hereinafter, one feature of the present invention resides, briefly stated, in an expansible fixing plug having an internal bore passing right through the plug body into which an expansion bolt in the form of a nail or screw is to be driven, wherein in accordance with the present invention the internal bore in the expansible fixing plug is arranged helically wound around the center line, and at least for a part of its length has a diameter that is the same or slightly smaller than the outer diameter of the expansion bolt. Because the internal bore is wound helically around the centre line of the expansible fixing plug, an eccentricity that changes sinusoidally for the length of the expansible fixing plug and which additionally rotates around the centre line is achieved. At each point of the expansible fixing plug the cylindrical expansion bolt consequently produces an expansion corresponding to the eccentricity of the internal bore at that particular point with respect to the outer circumference of the expansible fixing plug. Because the internal bore passes through the plug body in the form of a helical column, even when the diameter of the internal bore corresponds to the outer diameter of the expansion bolt, an expansion manifesting itself helically is consequently generated at the outer circumference of the expansible fixing plug, which produces a uniform expansion force distributed over the entire circumference, avoiding stress peaks. Because the diameter of the internal bore is the same as or only slightly smaller than the outer diameter of the expansion bolt, the expansion is achieved with a very low insertion resistance. The expansible fixing plug according to the invention is suitable for anchoring in all building materials; because stress peaks are avoided and the expansion effect is distributed over the entire length of the expansible fixing plug, the fixing plug is especially suitable for use in soft and porous building materials.

With solid building materials, a slight increase in the expansion effect at the bottom of the drilled hole is useful in order to increase the withdrawal force. This can be achieved in a simple manner by virtue of the diameter of the internal bore being approximately the same as the outer diameter of the expansion bolt at the rear end of the fixing plug and tapering slightly and uniformly towards the leading end of the fixing plug to a diameter that is smaller than the outer diameter of the expansion bolt.

Moreover, it has been shown that an ideal ratio between the insertion resistance and the anchoring effect is achieved if the maximum eccentricity of the centre line of the internal bore to the longitudinal axis of the expansible fixing plug is approximately the same as half the diameter of the internal bore.

Furthermore, it is useful for the internal bore to be shaped so that there are at least two complete turns for the length of the expansible fixing plug.

In order to be able to use a somewhat harder material for the expansible fixing plug, it is advantageous for this to be provided with several longitudinal slits. These longitudinal slits can be located in sections and offset from one another on the outer circumference and in the longitudinal direction, the offset of the longitudinal slits at the outer circumference preferably being 90° in each case. The longitudinal slits can be arranged either axially parallel or helically corresponding to the internal bore.

In conjunction with the use of an expansion bolt in the form of a nail, it is useful to provide the internal bore with at least one groove running along its surface-generating line, in which a thread arranged on the expansion bolt in the form of a nail engages. This thread produces a self-locking effect, which prevents the expansion bolt from coming loose when a tensile force acts on the expansion bolt in the form of a nail.

The expansible fixing plug according to the invention is normally manufactured from a plastics material by an injection-moulding method. For special applications, for example in ceilings and areas at risk from fire, the expansible fixing plug according to the invention can also be manufactured from metal. Manufacture is then effected by the metal injection-moulding method known per se. According to this method, the expansible fixing plug is manufactured from powdered metal in an injection-moulding operation involving a system of binders and subsequent removal of the binders and sintering.

The novel features which are considered as characteristic for the invention are set forth in particular in the appended claims. The invention itself, however, both as to its construction and its method of operation, together with additional objects and advantages thereof, will be best understood from the following description of specific embodiments when read in connection with the accompanying drawings.

DESCRIPTION OF THE PREFERRED EMBODIMENTS

Figure 1:
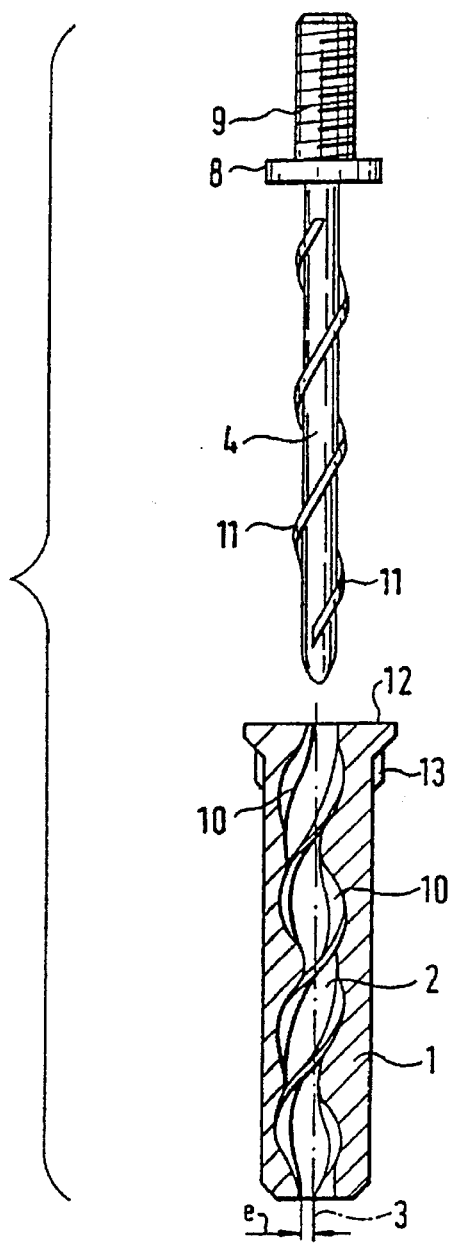
FIG. 1 shows the expansible fixing plug with an expansion bolt.

The expansible fixing plug 1 illustrated in FIG. 1 has an internal bore 2 which passes right through the plug body and winds helically around the centre line 3. The diameter of the internal bore 2 corresponds approximately to the outer diameter of the expansion bolt 4. The expansion effect of the fixing plug 1 as the expansion bolt 4 is driven into the helical internal bore 2 is achieved in that the helical internal bore produces an eccentricity e with respect to the centre line 3 that changes sinusoidally for the length of the expansible fixing plug. The maxium eccentricity substantially corresponds to half the diameter of the internal bore. The particular eccentricity at a specific point causes a bulge at the opposite point, which manifests itself at the outer circumference of the expansible fixing plug as a helix (see FIG. 2). When the solid building material 5 is soft, these bulges press into the wall of the drilled hole 7.

Figure 2:
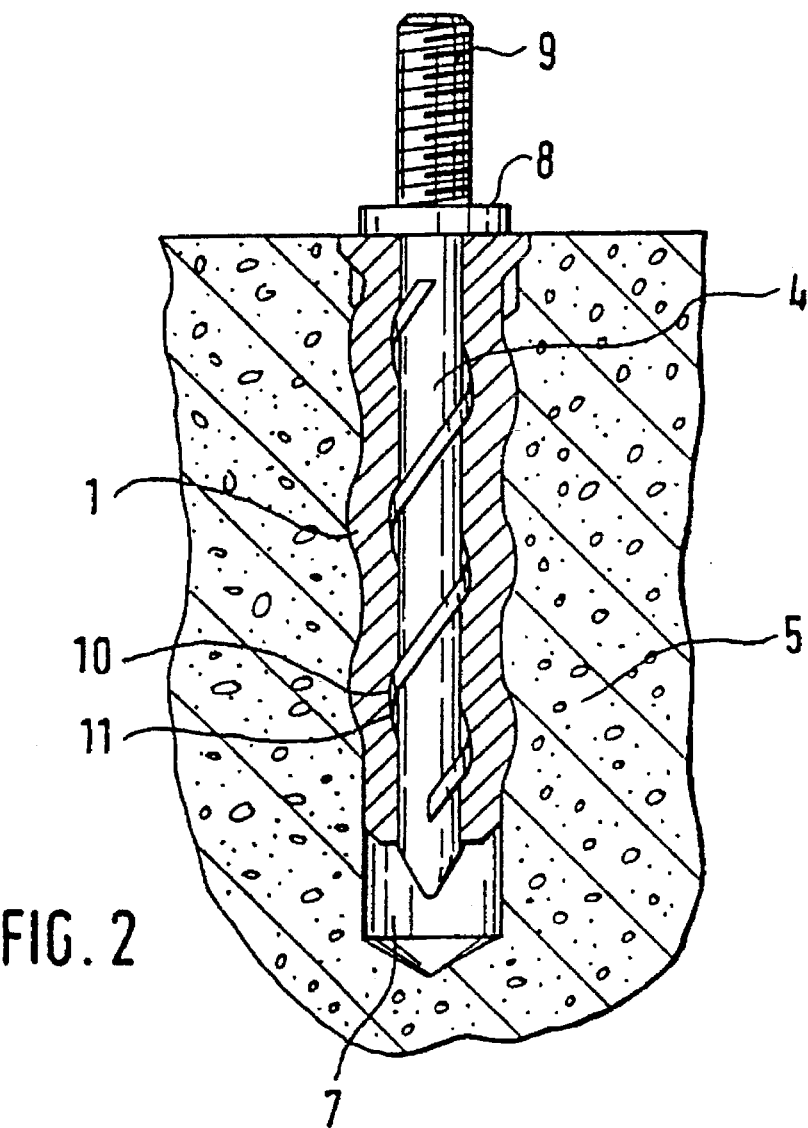
FIG. 2 shows the expansible fixing plug of FIG. 1 anchored in a hole drilled in masonry.

The expansion bolt 4 used in FIG. 1 and 2 has a collar 8 for limiting the depth of penetration and a connecting thread 9, for example for fixing a wire hanger for pipes, cable trunking or similar articles. The tensile force acting on the expansion bolt 4 could pull it out of the internal bore 2 of the fixing plug 1. To prevent this, the internal bore 2 of the expansible fixing plug 1 is provided with two opposing grooves 10 running along the surface-generating line of the internal bore. As the expansion bolt 4 is driven into the internal bore 2, the two opposing threads 11 on the expansion bolt 4 engage in the grooves 10 of the internal bore 2. This causes the expansion bolt 4 and the expansible fixing plug 1 to interlock, which prevents the expansion bolt 4 from being pulled out by an axial tensile force. To limit its insertion depth, the fixing plug 1 is provided with a lip 12, and to prevent it rotating, it is provided with longitudinally running ribs 13 starting from the lip 12.

Figure 3:
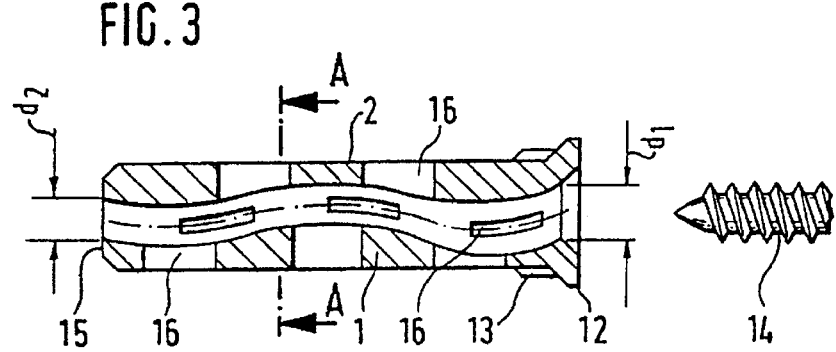
FIG. 3 shows an embodiment of the expansible fixing plug provided with longitudinal slits.
Figure 4:
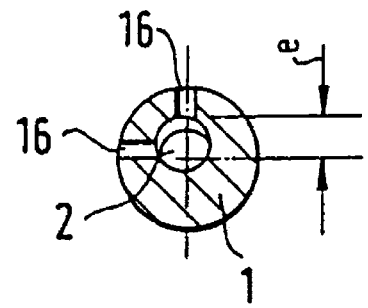
FIG. 4 shows a cross-section along the section line A—A shown in FIG. 3.

In the embodiment of the expansible fixing plug 1 illustrated in FIG. 3, the helical internal bore 2 has a diameter $d_1$ at the rear end of the plug which corresponds approximately to the outer diameter of the fixing screw 14 used in this embodiment as an expansion bolt. The internal bore 2 tapers towards the leading end 15 of the plug to the diameter $d_2$, which is the same as or slightly larger than the core diameter of the fixing screw 14. Thus, in addition to the helical bulging of the fixing plug as the fixing screw is screwed in, an expansion that increases towards the bottom of the drilled hole is achieved. In particular when using a relatively hard plastics material or when manufacturing the fixing plug 1 from metal, the expansible fixing plug 1 is provided with several longitudinal slits 16. In the embodiment illustrated in FIG. 3, the longitudinal slits 16 are located in sections and offset with respect to one another on the outer circumference and in the longitudinal direction. In FIG. 4, it is clear that the offset is 90° in each case, and the longitudinal slits 16 are overlapped so that at every point of the fixing plug there are at least two longitudinal slits. Furthermore, the longitudinal slits can be arranged helically, running parallel to the internal bore 2.

Figure 5:
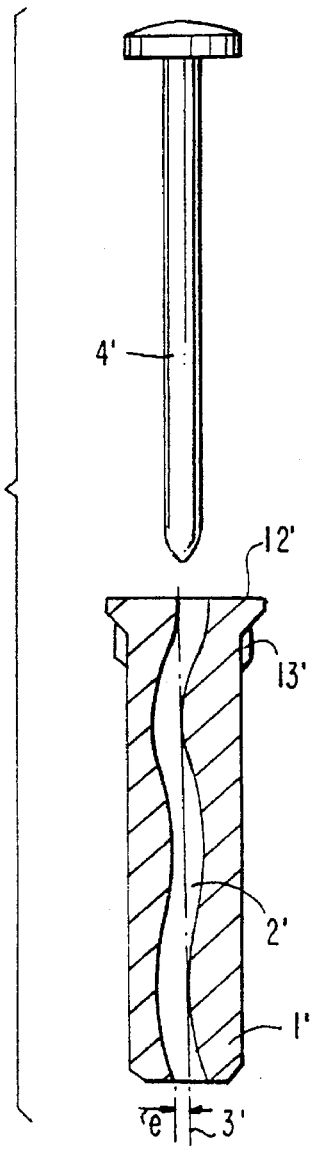
FIG. 5 shows the expansible fixing plug with an expansion bolt in accordance with another embodiment of the invention.
Figure 6:
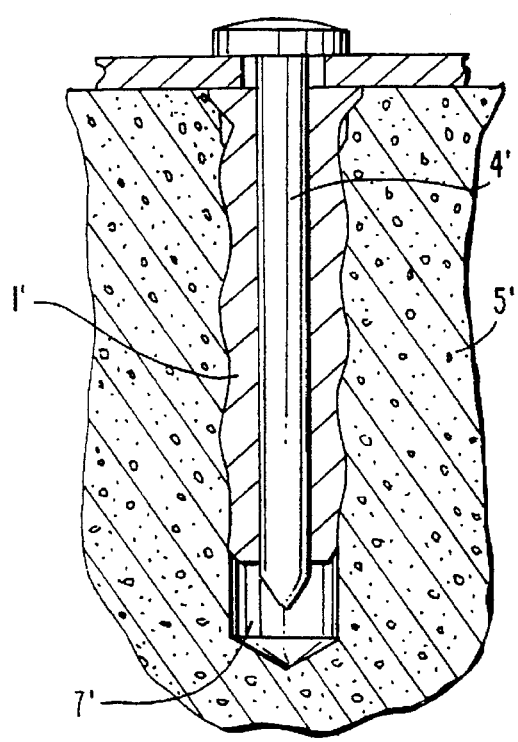
FIG. 6 shows the expansible fixing plug of FIG. 5 anchored in a hole drilled in masonry.

FIGS. 5 and 6 are views showing another embodiment of the present invention. In this embodiment the elements which are substantially similar to the elements of the previous embodiment are identified with the same reference numerals with the addition of primes. As can be seen from this figures, the expansion bolt 4' is formed as a nail.

Manufacture of the expansible fixing plug 1 from plastics material is effected by an injection-moulding process and from metal likewise by a metal injection-moulding process known per se. In this process, the plug is produced from powdered metal by an injection-moulding operation which involves a system of binders and subsequent removal of the binders and sintering.

It will be understood that each of the elements described above, or two or more together, may also find a useful application in other types of constructions differing from the types described above.

While the invention has been illustrated and described as embodied in an expansible fixing plug, it is not intended to be limited to the details shown, since various modifications and structural changes may be made without departing in any way from the spirit of the present invention.

Without further analysis, the foregoing will so fully reveal the gist of the present invention that others can, by applying current knowledge, readily adapt it for various applications without omitting features that, from the standpoint of prior art, fairly constitute essential characteristics of the generic or specific aspects of this invention.

What is claimed as new and desired to be protected by Letters Patent is set forth in the appended claims:

1. An expansible fixing plug, having a plug body provided with an internal bore; a straight expansion bolt having a substantially smooth outer surface and driveable in said internal bore of said plug body, said internal bore of said plug body at least for a part of its length having a diameter which is at most equal to an outer diameter of said expansion bolt, said internal bore of said plug body being arranged helically wound around a central longitudinal axis of said plug body so that expansion bolt is driveable in said helically wound internal bore of said plug body to obtain a helical outer circumference.

2. An expansible fixing plug as defined in claim 1, wherein the diameter of said internal bore at a rear end of said plug body is substantially equal to said outer diameter of said expansion bolt and tapers uniformly toward a leading end of said plug body to a diameter which is smaller than said outer diameter of said expansion bolt.

3. An expansible fixing plug as defined in claim 1, wherein said internal bore has a center line which is eccentric with respect to said central longitudinal axis of said plug body and has an eccentricity substantially corresponding to half the diameter of said internal bore.

4. An expansible fixing plug as defined in claim 1, wherein said internal bore has at least two complete turns for a length of said plug body.

5. An expansible fixing plug as defined in claim 1, wherein said plug body is provided with a plurality of longitudinal slits.

6. An expansible fixing plug as defined in claim 5, wherein said longitudinal slits are located in section and offset relative to one another on an outer circumference and in a longitudinal direction.

7. An expansible fixing plug as defined in claim 6, wherein the offset of said slits on the outer circumference is 90°.

8. An expansible fixing plug as defined in claim 5, wherein said longitudinal slits are arranged helically in correspondence with said internal bore.

9. An expansible fixing plug as defined in claim 1, wherein said internal bore has at least one groove extending along its surface-generating line, said expansion bolt having a thread arranged in said at least one groove.

10. An expansible fixing plug as defined in claim 1, wherein said expansion bolt is formed as a nail.

11. An expansible fixing plug as defined in claim 1, wherein said expansion bolt is formed as a screw.

12. An expansible fixing plug as defined in claim 1, wherein said plug body is composed of an injection molded powdered metal.

13. A method of producing an expansible fixing plug having a plug body provided with an internal bore, an expansion bolt driveable in said internal bore of said plug body, said internal bore of said plug body is arranged helically wound around a center line and at least for a part of its length having a diameter which is at most equal to an outer diameter of said expansion bolt, the method comprising the steps of manufacturing the plug body from powdered metal in an injection-molding operation which involves a system of binders; subsequently removing the binders; and sintering the body.

14. An expansible fixing plug, having a plug body provided with an internal bore; and a straight expansion bolt driveable in said internal bore of said plug body, said internal bore of said plug body at least for a part of its length having a diameter which is at most equal to an outer diameter of said expansion bolt and being helically wound around a central longitudinal axis of said plug body, so that when said expansion bolt is driveable in said helically wound internal bore having a diameter which is at most equal to an outer diameter of said expansion bolt, said plug body is deformed and a helical outer circumference is provided on said plug body.

* * * * *